(12) United States Patent
Eike et al.

(10) Patent No.: US 9,334,943 B2
(45) Date of Patent: May 10, 2016

(54) TRANSVERSE POWER TRAIN

(71) Applicant: Deere & Company, Moline, IL (US)

(72) Inventors: Craig R. Eike, Coffeyville, KS (US);
Kyle K. McKinzie, Altamont, KS (US);
Steven R. Fliearman, Coffeyville, KS (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 14/108,069

(22) Filed: Dec. 16, 2013

(65) Prior Publication Data

US 2015/0167811 A1  Jun. 18, 2015

(51) Int. Cl.
*F16H 48/38* (2012.01)
*B60K 1/00* (2006.01)
*B60K 17/36* (2006.01)

(52) U.S. Cl.
CPC *F16H 48/38* (2013.01); *B60K 1/00* (2013.01); *B60K 17/36* (2013.01); *B60K 2001/001* (2013.01); *B60Y 2200/411* (2013.01)

(58) Field of Classification Search
CPC .... B60K 17/36; B60K 1/00; B60K 2001/001; B60Y 2200/411; F16H 48/38
See application file for complete search history.

(56) References Cited

U.S. PATENT DOCUMENTS

| 4,186,815 A * | 2/1980 | Hart | B60G 17/033 180/24.08 |
|---|---|---|---|
| 4,223,569 A | 9/1980 | Koivunen | |
| 4,611,504 A | 9/1986 | Rundle | |
| 2005/0023053 A1* | 2/2005 | Bennett | B60K 6/46 180/65.1 |
| 2013/0196812 A1 | 8/2013 | Smemo et al. | |
| 2013/0240282 A1 | 9/2013 | Bindl | |

FOREIGN PATENT DOCUMENTS

| DE | 102011076523 | 11/2012 |
|---|---|---|
| WO | 2011062545 | 5/2011 |

OTHER PUBLICATIONS

European Search Report for related application No. EP14195240, May 8, 2015.

* cited by examiner

*Primary Examiner* — Derek D Knight
(74) *Attorney, Agent, or Firm* — Ingrassia, Fisher & Lorenz PC

(57) ABSTRACT

A power train apparatus and motor grader are described. The apparatus or motor grader includes a power source for providing rotational mechanical power. A first output interface of the power source is driven by the rotational mechanical power from the power source and rotates around a first axis A differential includes at least one output shaft rotating around a second axis offset from and parallel to the first axis. A first gear is included in the differential, the first gear rotating around the second axis and providing rotational mechanical power to the at least one output shaft of the differential. A second gear rotates around the first axis, the second gear receiving rotational mechanical power from the output interface to the power source and providing rotational mechanical power to the first gear.

11 Claims, 4 Drawing Sheets

TRANSVERSE POWER TRAIN

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power trains, including power trains for vehicles.

BACKGROUND OF THE DISCLOSURE

In various applications, and with respect to various vehicles, there may be considerable advantages to reducing the envelope required to house power train components. For example, in outfitting older vehicle bodies with updated power train systems, it may be useful to design the updated power train systems (or components thereof) to fit within existing power train envelopes of the older vehicles. In this way, for example, potentially costly redesign of aspects of the older vehicles (e.g., aspects of existing power train envelopes) may be avoided.

SUMMARY OF THE DISCLOSURE

A power train apparatus and motor grader including a power train are disclosed.

According to one aspect of the disclosure, the power train apparatus (or motor grader) includes a power source for providing rotational mechanical power. The power source includes a first output interface driven by the rotational power from the power source and rotating around a first axis. The apparatus (or motor grader) includes a differential with at least one output shaft rotating around a second axis that is offset from and parallel to the first axis. The differential includes a first gear rotating around the second axis and providing rotational mechanical power to the at least one output shaft of the differential. The apparatus (or motor grader) further includes a second gear rotating around the first axis, the second gear receiving rotational mechanical from the output interface and providing mechanical power to the first gear.

One or more of the following features may also be included in the disclosed power train apparatus (or motor grader). The power source, the differential and the first and the second gears may be included in a vehicle (such as a motor grader) having one or more sets of bogie wheels, which may receive rotational mechanical power from the at least one output shaft of the differential. A primary rotational axis of the power source may be oriented transversely to a primary front-to-back axis of the motor grader. The power source may include an electric machine.

The power train apparatus (or motor grader) may include a transmission having an input interface and a second output interface. The input interface may receive rotational mechanical power from the first output interface, and the second output interface may receive rotational mechanical power from the input interface in order to provide rotational mechanical power to the second gear. The second gear may be located between the transmission and the power source. A first shaft may transmit rotational mechanical power between the first output interface and the input interface. A second shaft, coaxial with the first shaft, may transmit rotational mechanical power between the second output interface and the second gear.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed lubrication apparatus, as shown in the accompanying figures of the drawings described briefly above. Various modifications to the example embodiments may be contemplated by one of skill in the art.

As also noted above, it may be useful to provide for compact configurations for various power train components. This may be particularly useful, for example, in retrofitting existing vehicles (and vehicle platforms) with updated power train systems. For example, in replacing a traditional internal combustion engine with an electric drive system, it may be useful to provide for an electric drive system that fits within an existing power train envelope in the relevant vehicle. Among other benefits, the disclosed power train apparatus may address this issue by providing for relatively compact arrangement of power train components. For example, the disclosed apparatus may provide a power source and transmission oriented transverse to the front-to-back axis of a vehicle. In certain embodiments, such a configuration may allow for an alignment of power output shafts of the power source and transmission that is parallel to an alignment of output shafts of an associated differential. Various gearing and shaft arrangements may be utilized with respect to this parallel alignment. In certain embodiments, the power source may include an internal combustion engine. In certain embodiments, the power source may include an electrical machine, a hydrostatic machine, or another type of power source.

Figure 1:
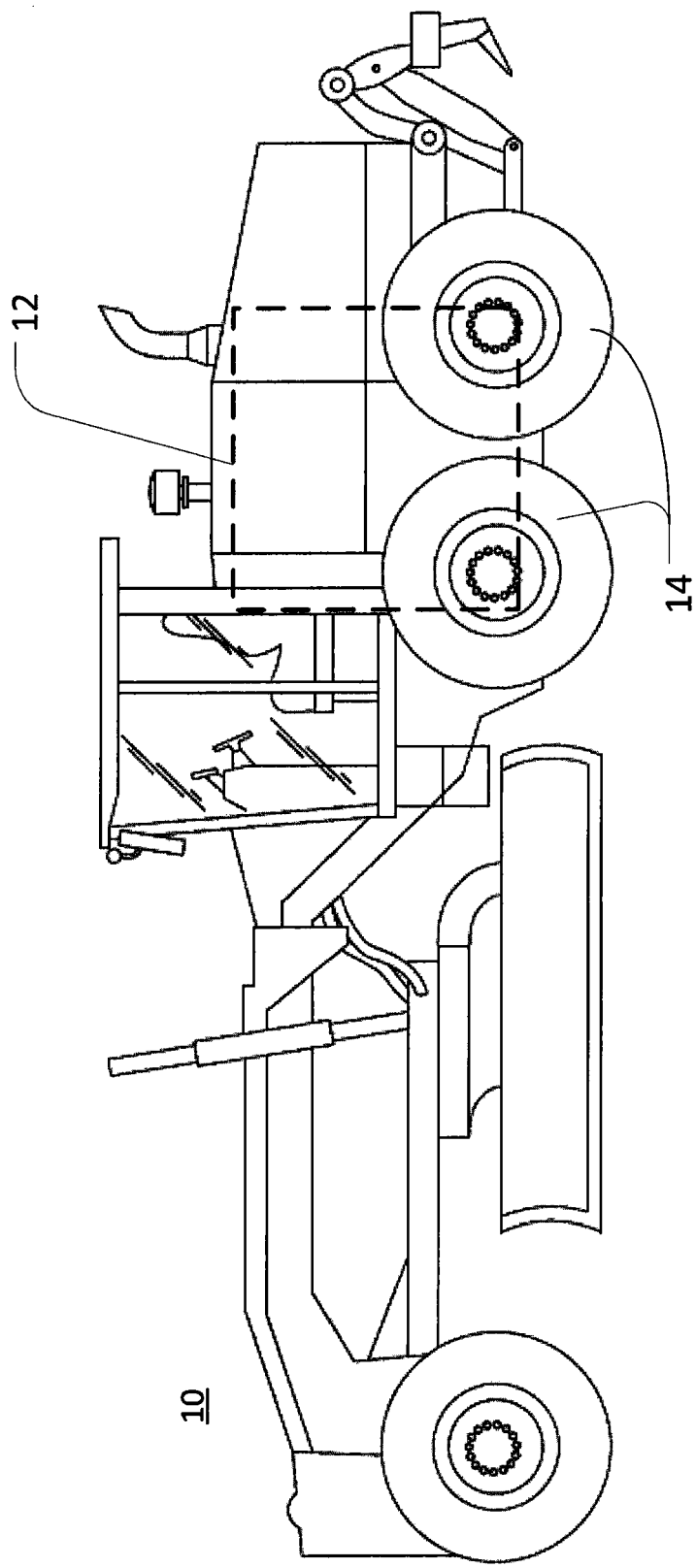
FIG. 1 is a side view of an example motor grader in which the disclosed power train apparatus may be implemented.

Referring now to FIG. 1, motor grader 10 is depicted, with a primary front-to-back axis extending from left to right. In various embodiments, the disclosed power train apparatus may be employed in motor grader 10, as well as various other vehicle types. With respect to motor grader 10, for example, it may be difficult to package all of the necessary (or desired) components of a more conventional power train into the existing power train envelope(s) of the grader, which may be represented schematically as power train 12. This difficulty may be further complicated, in certain instances, by the use of bogie wheels 14 in grader 10 (or other vehicle types). In this regard, a transverse power train arrangement may be of some benefit to motor grader 10 (or other vehicle types), including in configurations utilizing bogie wheels (as in FIG. 1). As used herein, "transverse" may generally refer to an orientation that is generally perpendicular to a reference axis. With respect to motor grader 10, for example, a transverse transaxle (or other apparatus) may be configured to provide (and transmit) rotational power along axes that are generally perpendicular to the primary front-to-back axis of grader 10 (i.e., along axes that are generally perpendicular to the plane of FIG. 1).

Figure 2:
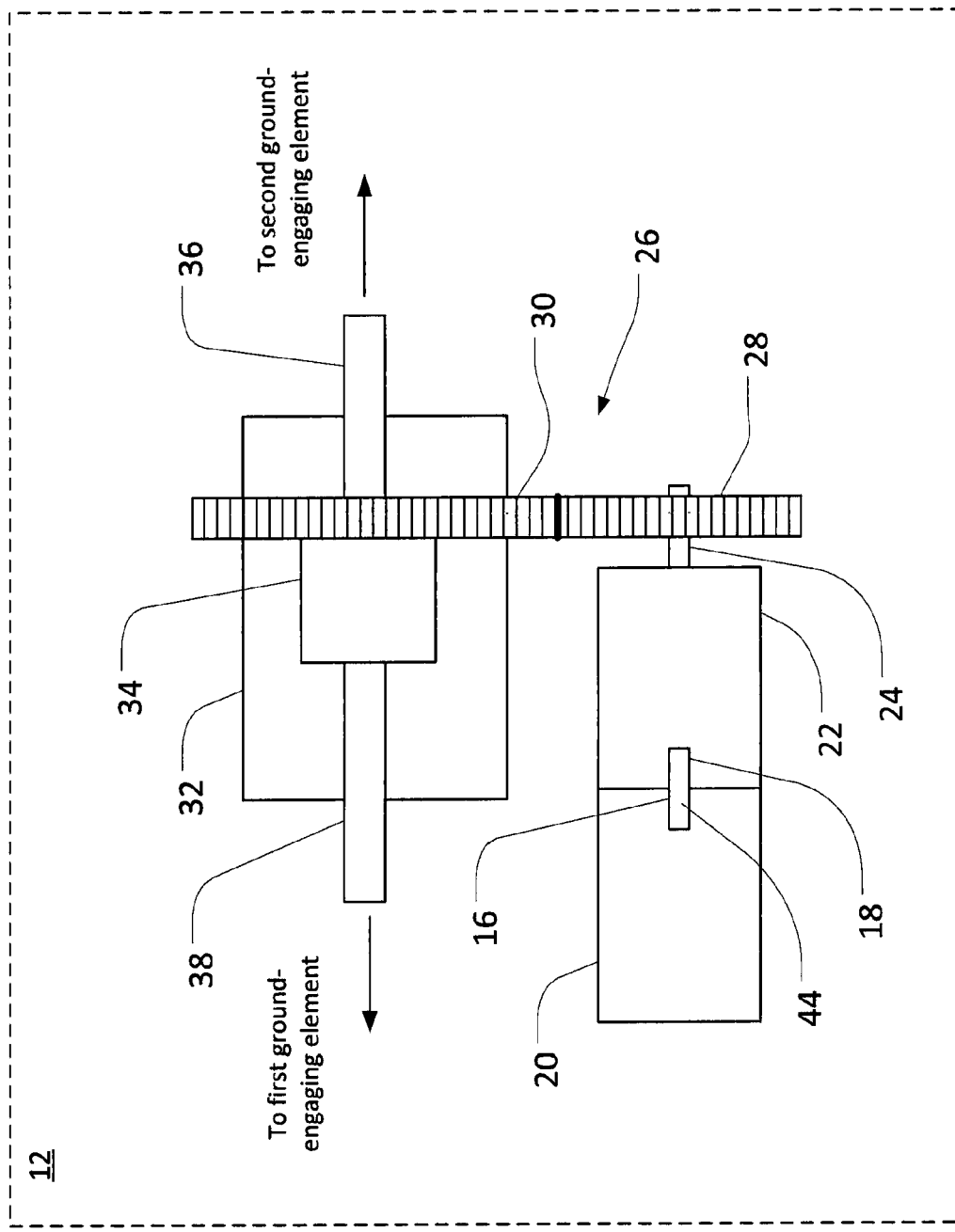
FIG. 2 is a schematic view of an implementation of the disclosed power train apparatus in the motor grader of FIG. 1.

Referring also to FIG. 2, the disclosed power train apparatus is depicted as a transaxle assembly including a power source 20, which may be an internal combustion (or other) engine, an electrical machine (e.g., as powered by a separate generator (not shown) attached to a separate internal combustion engine (not shown)), a hydrostatic machine (e.g., as powered by a separate pump (not shown) attached to a separate internal combustion engine). As depicted in FIG. 2, the various axes of rotation (e.g., the axis of rotation of the output of power source 20, extending left-to-right in FIG. 2) may be oriented transverse to the front-to-back axis of grader 10 (i.e., an axis extending left-to-right in FIG. 1).

Power source 20 may provide rotational mechanical power to transmission 22. For example, stub shaft 44 may engage with an output interface of power source 20 (e.g., splined connection 16, or a bolted connection, an integrally formed shaft connection, and so on (not shown), at power source 20) and may extend to also engage with an input interface of transmission 22 (e.g., splined connection 18, or a bolted connection, integrally formed shaft connection, and so on (not shown), at transmission 22), thereby allowing transfer of rotational power from power source 20 to transmission 22. Transmission 22 may include any variety of arrangements and gearings, including range gear sets, speed gear sets, clutches and brakes of various types, various internal shafts, and so on.

Transmission 22 (or power source 20, if transmission 22 is not utilized) may provide rotational power to parallel axis gear set 26. For example, rotational power may be transmitted from transmission 22, via shaft 24, to gear 28 (e.g., a conventional spur gear). Gear 28 may be meshed with bull gear 30, with each of gears 28 and 30 rotating around an axis that is parallel to the rotational axis of the other gear 30 or 28. Bull gear 30 may be included in differential 32 (or another power train apparatus).

Differential 32 may include various other components, such as gearing 34 (e.g., various spider and side gears), and output shafts 36 and 38. With respect to motor grader 10, for example, output shafts 36 and 38 may provide drive power to bogie wheels 14, on respective sides of grader 10.

In certain embodiments, bull gear 30 may take the place of a traditional ring gear within differential 32 (e.g., a traditional spiral bevel ring gear) and gear 28 may take the place of a traditional pinion gear for transmission of power to differential 32 (e.g., a conventional spiral bevel pinion gear). For example, in a traditional transaxle (or other) assembly, an output shaft of a power source or transmission may be oriented at a right (or other) angle to one or more output shafts of a differential. A pinion gear (e.g., a spiral bevel gear) at the end of the output shaft of the power source or transmission may accordingly mesh at a right (or other) angle with a ring gear of the differential, in order to transform the rotation from the power source/transmission into a perpendicular (or otherwise re-oriented) rotation at the output of the differential. Use of a transverse transaxle assembly, such as that depicted in FIG. 2, may allow for transmission of rotational power from power source 20 to the wheels of grader 10 (via output shafts 36 and 38) without requiring a right-angle (or otherwise angled) gear set, such as in the traditional configuration described above. This may represent another significant advantage of the contemplated power train apparatus, as eliminating angled gear sets and/or beveled gears from a power train design may significantly reduce the cost of manufacturing the power train.

It will be understood, as also noted above, that a variety of input and output interfaces may be utilized in the contemplated power train apparatus (and related vehicles). For example, an output interface may include an interface such as a splined connection, bolted connection, or integrally formed component that allows transmission of rotational power from a source (e.g., power source 20 or transmission 22) to an associated shaft (e.g., shaft 24) or component (e.g., transmission 22 or gear 28). Likewise, an input interface may be an interface such as a splined connection, bolted connection, or integrally formed component that facilitates reception of rotational power at a particular component or assembly (e.g., transmission 22 or gear 28) from a particular source (e.g., power source 20 or transmission 22) or associated component (e.g., shaft 24). In certain embodiments, a shaft (e.g., shaft 24) or gear (e.g., gear 28), or some portion thereof (e.g., an integral splined interface) may itself be considered an input or output interface. For example, if gear 28 is directly connected to (or integrally formed with, and so on) a component of transmission 22, gear 28 (or the component of transmission 22 to which it is connected) may be viewed as an output interface of transmission 22. Likewise, in the case of direct connection between components (e.g., as depicted between power source 20 and transmission 22 in FIG. 2), the final relevant force-transmitting component of the upstream component (e.g., power source 20) may be viewed as an output interface, and the initial relevant force-transmitting component of the downstream component (e.g., transmission 22) may be viewed as an input interface.

Figure 3B:
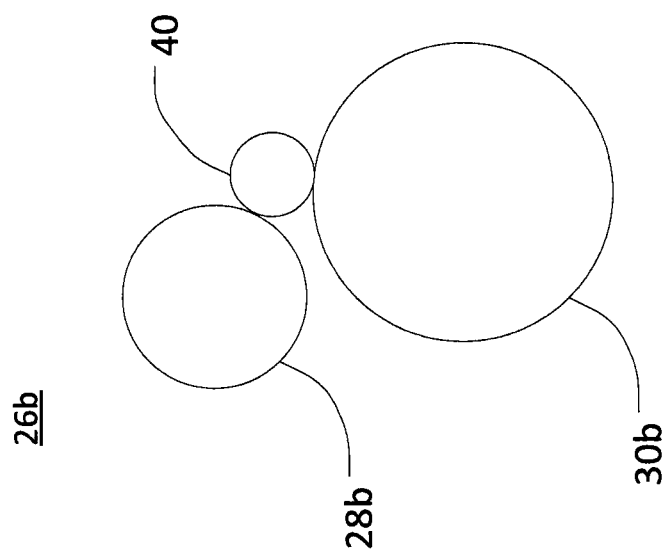
FIGS. 3A and 3B are schematic views of gearing configurations that may be utilized in the disclosed power train apparatus.
Figure 3A:
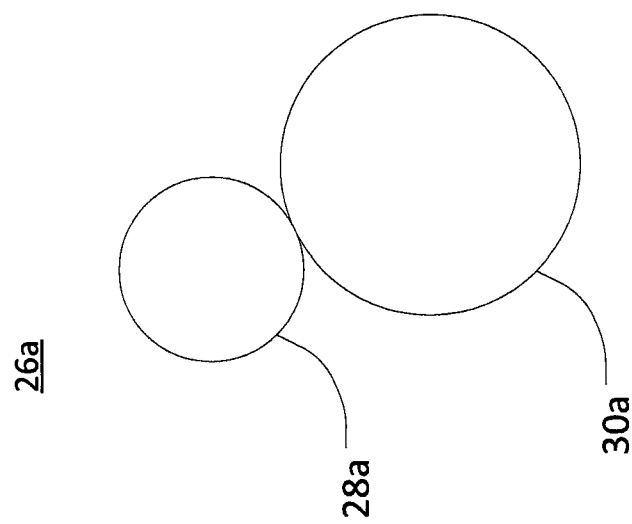

Referring also to FIGS. 3A and 3B, parallel axis gear set 26 may be configured in a variety of ways (e.g., as gear set 26a or gear set 26b). In certain embodiments, gear 28 (e.g., configured as gear 28a) may mesh directly with gear 30 (e.g., configured as gear 30a) in order to transmit rotational power from power source 20 (and transmission 22) to differential 32. In certain embodiments, gear 28 (e.g., configured as gear 28b) may transmit power to gear 30 (e.g., configured as gear 30b) via one or more interposed idler gears (e.g., idler gear 40). As depicted in FIG. 3B, for example, such idler gear(s) may also rotate around an axis parallel to the axes of gears 28 and 30.

Figure 4:
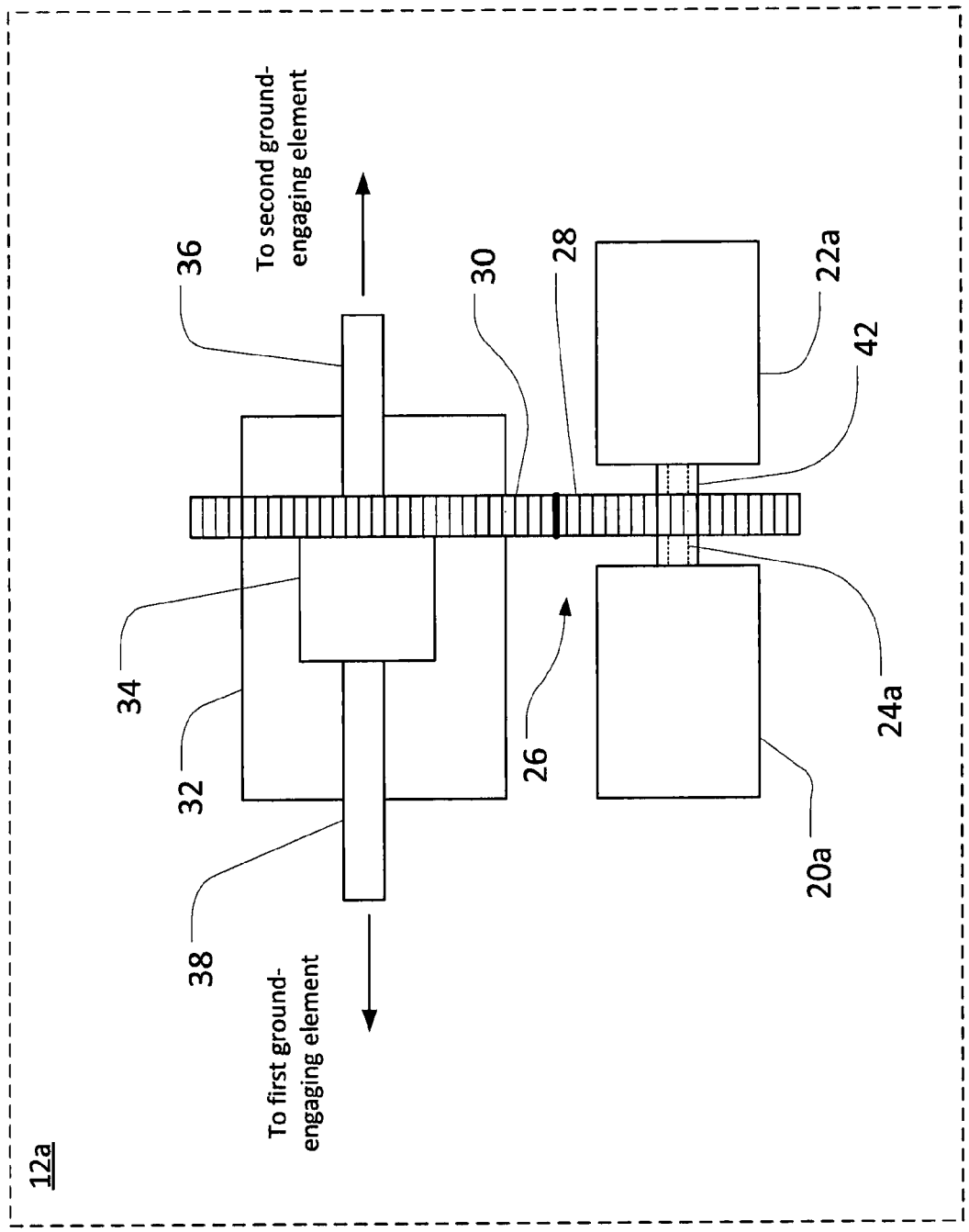
FIG. 4 is a schematic view of another implementation of the disclosed power train apparatus in the motor grader of FIG. 1.

Referring also to FIG. 4, in certain embodiments various components of the disclosed power train apparatus may be arranged in various ways. For example, gear 28 may be located between power source 20a and transmission 22a, which may provide additional space savings (or other benefits) with respect to a desired power train envelope. As depicted in FIG. 4, for example, coaxial shafts 24a and 42 may allow transmission of power from power source 20a to transmission 22a and then from transmission 22a to gear 28, which may be aligned coaxially between power source 20a and transmission 22a. For example, power may be transmitted from power source 20a to transmission 22a via internal coaxial shaft 24a. Power may then be transmitted from transmission 22a to gear 28 via external (hollow) coaxial shaft 42. As also described above, in such a configuration various types of power sources (e.g., internal combustion engines, electrical machines, and so on) and various types of transmissions may be utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power train apparatus, comprising:
   a power source for providing rotational mechanical power;
   a first output interface of the power source, the first output interface being driven by the rotational mechanical power from the power source and rotating around a first axis;
   a differential having at least one output shaft rotating around a second axis offset from and parallel to the first axis;
   a first gear included in the differential, the first gear rotating around the second axis and providing rotational mechanical power to the at least one output shaft of the differential;
   a second gear rotating around the first axis, the second gear receiving rotational mechanical power from the output interface to the power source and providing mechanical power to the first gear; and
   a transmission having an input interface and a second output interface;
   wherein the input interface receives rotational mechanical power from the first output interface; and
   wherein the second output interface receives rotational mechanical power from the input interface and provides rotational mechanical power to the second gear.

2. The power train apparatus of claim 1, wherein the power source, the differential and the first and the second gears are included in a motor grader.

3. The power train apparatus of claim 1, wherein the power source, the differential and the first and the second gears are included in a vehicle having one or more sets of bogie wheels; and
   wherein at least one of the one or more sets of bogie wheels receives rotational mechanical power from the at least one output shaft of the differential.

4. The power train apparatus of claim 1, wherein the power source includes an electric machine.

5. The power train apparatus of claim 1, wherein the second gear is located between the transmission and the power source.

6. The power train apparatus of claim 5, further comprising:
   a first shaft transmitting rotational mechanical power between the first output interface and the input interface; and
   a second shaft transmitting rotational mechanical power between the second output interface and the second gear;
   wherein the first shaft is coaxial with the second shaft.

7. A motor grader having a primary front-to-back axis, the motor grader comprising:
   a power source for providing rotational mechanical power around a primary rotational axis, the primary rotational axis being oriented transverse to the primary front-to-back axis of the motor grader;
   a first output interface of the power source, the first output interface being driven by the rotational mechanical power from the power source and rotating around a first axis parallel to the primary rotational axis;
   a differential having at least one output shaft, the at least one output shaft rotating around a second axis offset from and parallel to the first axis;
   a first gear included in the differential, the first gear rotating around the second axis and providing rotational mechanical power to the at least one output shaft of the differential;
   a second gear rotating around the first axis, the second gear receiving rotational mechanical power from the output interface to the power source and providing rotational mechanical power to the first gear; and
   a transmission having an input interface and a second output interface;
   wherein the input interface receives rotational mechanical power from the first output interface; and
   wherein the second output interface receives rotational mechanical power from the input interface and provides rotational mechanical power to the second gear.

8. The motor grader of claim 7, further comprising:
   one or more bogie wheels receiving rotational mechanical power from the at least one output shaft of the differential;
   wherein the one or more bogie wheels rotate around one or more wheel axes that are parallel to the first axis.

9. The motor grader of claim 7, wherein the power source includes an electric machine.

10. A motor grader having a primary front-to-back axis, the motor grader comprising:
    a power source for providing rotational mechanical power around a primary rotational axis, the primary rotational axis being oriented transverse to the primary front-to-back axis of the motor grader;
    a first output interface of the power source, the first output interface being driven by the rotational mechanical power from the power source and rotating around a first axis parallel to the primary rotational axis;
    a differential having at least one output shaft, the at least one output shaft rotating around a second axis offset from and parallel to the first axis;
    a first gear included in the differential, the first gear rotating around the second axis and providing rotational mechanical power to the at least one output shaft of the differential; and
    a second gear rotating around the first axis, the second gear receiving rotational mechanical power from the output interface to the power source and providing rotational mechanical power to the first gear;
    wherein the second gear is located between the transmission and the power source.

11. A motor grader having a primary front-to-back axis, the motor grader comprising:
- a power source for providing rotational mechanical power around a primary rotational axis, the primary rotational axis being oriented transverse to the primary front-to-back axis of the motor grader;
- a first output interface of the power source, the first output interface being driven by the rotational mechanical power from the power source and rotating around a first axis parallel to the primary rotational axis;
- a differential having at least one output shaft, the at least one output shaft rotating around a second axis offset from and parallel to the first axis;
- a first gear included in the differential, the first gear rotating around the second axis and providing rotational mechanical power to the at least one output shaft of the differential;
- a second gear rotating around the first axis, the second gear receiving rotational mechanical power from the output interface to the power source and providing rotational mechanical power to the first gear;
- a first shaft transmitting rotational mechanical power between the first output interface and an input interface; and
- a second shaft transmitting rotational mechanical power between a second output interface and the second gear;
- wherein the first shaft is coaxial with the second shaft.

\* \* \* \* \*